United States Patent
Morley et al.

[11] 3,917,030
[45] Nov. 4, 1975

[54] HIGH ENERGY ABSORBING COMPOSITE ARTICLES

[75] Inventors: John G. Morley, Little Eaton; Robert S. Millman, Nottingham, both of England

[73] Assignee: National Research Development Corporation, London, England

[22] Filed: Jan. 24, 1973

[21] Appl. No.: 326,356

[30] Foreign Application Priority Data
Jan. 28, 1972  United Kingdom............... 4061/72

[52] U.S. Cl................................. 188/1 C; 297/386
[51] Int. Cl.²............................................ F16F 7/12
[58] Field of Search........... 188/1 B, 1 C; 242/54 R; 280/150 SB; 297/386

[56] References Cited
UNITED STATES PATENTS
2,682,931   7/1954   Young............................... 188/1 C
3,217,838   11/1965  Peterson et al..................... 188/1 C
3,308,908   3/1967   Bunn................................. 188/1 C
3,361,475   1/1968   Villiers........................... 188/1 C X

*Primary Examiner*—Duane A. Reger
*Attorney, Agent, or Firm*—Alan H. Levine

[57] ABSTRACT

A stress limiting device comprising a plurality of parallel elements each consisting of an outer member and an inner member, the inner member being of convoluted, sinuous, corrugated or like form and the peaks of the convolutions or the like being in frictional contact with the associated outer member, the arrangement being such that stress may be applied between the several inner members on the one hand and the several outer members on the other hand to cause bodily movement of the whole of each inner member relative to the whole of the associated outer member.

29 Claims, 7 Drawing Figures

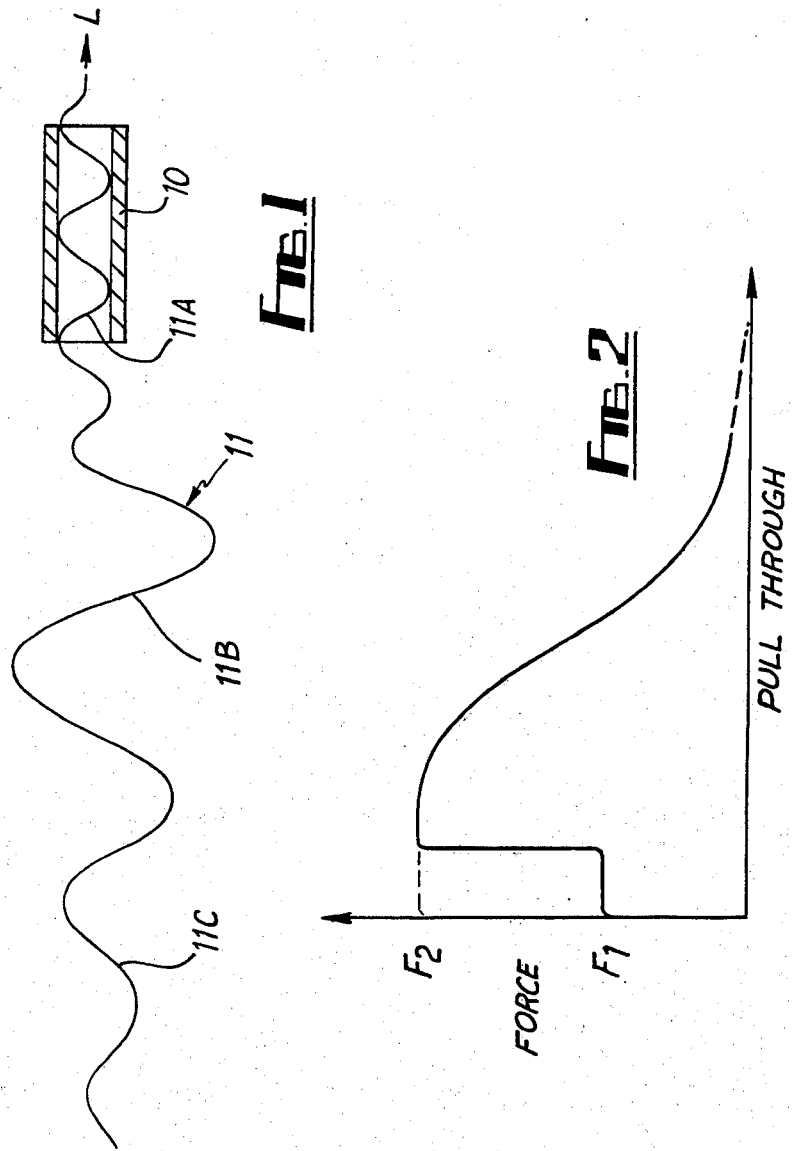

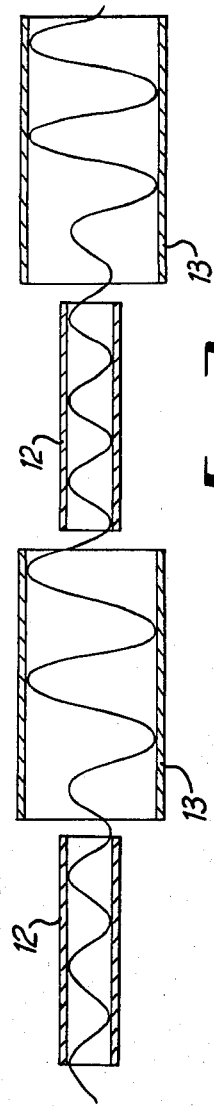
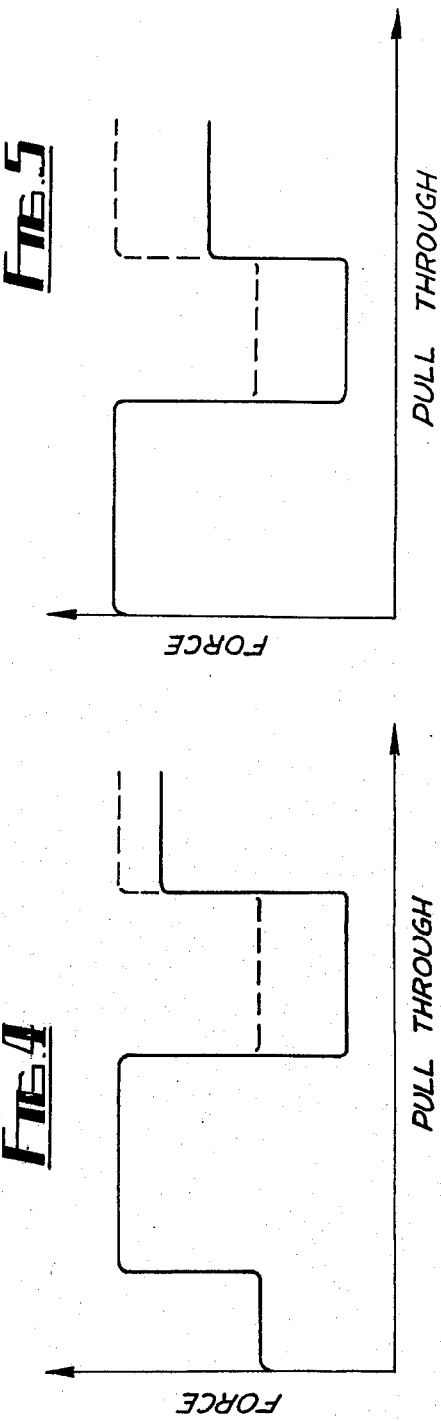

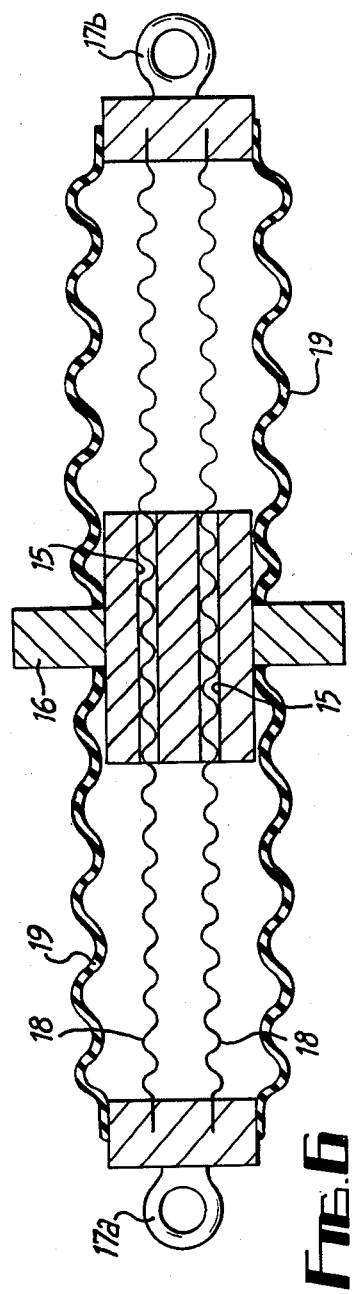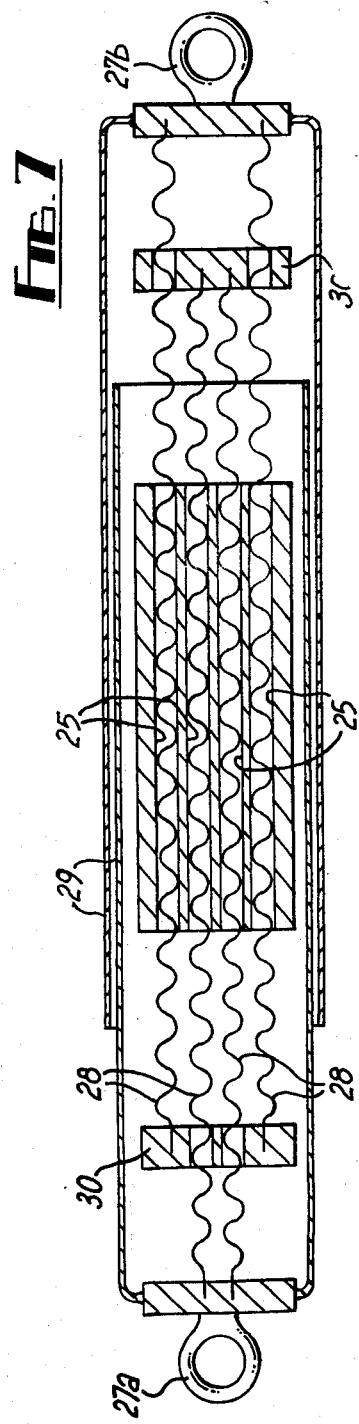

HIGH ENERGY ABSORBING COMPOSITE ARTICLES

The invention relates to high energy absorbing composite articles.

In French Pat. No. 7,032,188 there is described a technique designed to improve the properties of continuous fibre reinforced composite materials by providing that the interfacial contact between reinforcing fibres and the material around them is such that the local shear strength of the interfacial bond is reduced as the local tensile stress in the material increases. This is achieved by inducing controlled de-bonding of the interface under tensile load, the arrangement preferably being such that the local shear strength of the interfacial bond is reduced to zero at a local tensile stress in the material just less than the ultimate tensile stress of the fibres.

The present invention makes use of the variable shear strength mechanism of the aforesaid patent to provide shock-absorbing or stress limiting structures.

The invention provides a stress limiting device comprising a plurality of parallel elements each consisting of an outer member and an inner member, the inner member being of convoluted, sinuous, corrugated or other like form (hereinafter referred to for convenience as "convoluted") having alternate peaks and valleys when viewed from the side, and the peaks of the convolutions or the like being in frictional contact with the associated outer member, the arrangement being such that stress may be applied between the several inner members on the one hand and the several outer members on the other hand to cause bodily movement of the whole of each inner member relative to the whole of the associated outer member.

The outer members may be consolidated to form a unitary body member or could comprise a number of tubes bonded together, or a series of spaced, parallel plates. Where the inner members are corrugated the load must be applied transversely to and not parallel to the corrugations.

Generally attachment means will be provided on one of the members of each element such that when the other member is held against movement a load may be applied through said attachment means to move the one member relative to the other. Preferably attachment means are provided on both the members of each element to enable movement of the groups of members in opposite directions.

In one advantageous form of device according to the invention the effective lengths of the convoluted or like inner member and the outer member of each element are different in order that the device may absorb several shock loads before the inner and outer members become separated. Thus the convoluted inner member may project at one or both ends from the outer member or the latter may be longer than the convoluted length of the inner member.

In another advantageous arrangement means may be provided to vary the stress carrying capability of the device at different locations along its length. For this purpose the amplitude and/or wave length of the convolutions or the like of the inner member of at least some of the elements and/or the internal cross-sectional size and/or shape of the outer member of at least some of the elements may vary along the length of the device.

When devices of the kind referred to are subjected to a tensile load the sum of the frictional forces between the several inner members and their associated outer members will carry the load to a certain level at which the inner members tend to straighten out, thereby reducing the total frictional force and resulting in sliding of one group of members relative to the other. The stress or pull-through load necessary to produce sliding will be that required to draw the convolutions or the like of the inner members away from the surfaces of the outer members with which they are in frictional contact. Where variable amplitude or wave-length convolutions are utilised the stress required to produce sliding will be increased by the stress necessary to bring about sufficient plastic deformation to draw additional convolutions or the like into the outer members.

Embodiments of the invention will now be described, by way of example only, with reference to the accompanying drawings, in which:

FIG. 1 is a diagram illustrating the broad principle of one form of the invention;

FIG. 2 is an illustrative force/displacement diagram in respect of devices constructed from elements of the kind shown in FIG. 1;

FIG. 3 is a diagram showing the broad principle of an alternative form of the invention;

FIGS. 4 and 5 show illustrative force/displacement diagrams in respect of devices constructed from elements of the kind shown in FIG. 3;

FIG. 6 is a cross-section through one practical form of device according to the invention; and FIG. 7 is a view similar to FIG. 6 showing a modification.

Referring to the drawings, FIG. 1 shows one element of a kind which may be used to construct one form of stress limiting device according to the invention. The element comprises an outer tube 10 through which a convoluted wire 11 passes. The convolutions of the wire are of constant amplitude in the region 11A located in the tube, of considerably increased amplitude in the central region 11B, and of gradually reducing amplitude in the end region 11C. In constructing a stress limiting device a large number of such elements would be connected together in parallel and the force required to displace the wires relative to the tubes under a tensile load applied in the direction of arrow L would then be of the general form shown in FIG. 2. Initially a constant force $F_1$ would be required to move the constant amplitude regions 11A through the tubes. Thereafter the required force would rise sharply to point $F_2$. This rise is due to the additional force required to plastically deform the large amplitude convolutions of the regions 11B to draw them into the tubes. Thereafter the force required becomes gradually less with displacement since the amplitudes of the convolutions diminish.

It should be appreciated that the graph of FIG. 2 is diagrammatic only and shows the general shape which such a curve would take. In practice the various sections of the curve would have superimposed on them variations and fluctuations dependent on the number of elements, the amplitude and frequency of the convolutions and other factors. Nevertheless the graph would take the general form shown.

In devices constructed from elements of the kind illustrated in FIG. 1, the pull-through force required to effect relative displacement of the inner and outer members includes a component brought about by the need to plastically deform the large amplitude convolutions in the regions 11B. Where the difference in amplitude of the convolutions is not as great, only elastic deformation may be necessary to draw additional convolutions into the tubes so that the pull-through force would be determined by the force required to bring about elastic deformation only. Where the wires or other inner members are formed from a non-ductile material, the amplitude or wave-length of the convolutions and the internal shape and size of the outer elements must be arranged such that the force required to draw additional convolutions into the outer members does not exceed the force which produces elastic deformation of the inner members otherwise these will break.

FIG. 3 shows a more complex element, a plurality of which may be arranged in parallel to produce a shock absorbing or stress limiting device. The element of FIG. 3 includes alternate sections of tube 12 and 13 of different diameters and alternate lengths of wire having convolutions whose amplitudes are respectively substantially equal to or slightly greater than the internal diameters of the tube sections so as to be in frictional contact therewith. FIG. 4 shows illustrative load/displacement diagrams for articles made from large numbers of elements of the kind shown in FIG. 3 connected in parallel, FIG. 4 corresponding to movement of the wires through the tubes from right to left and FIG. 5 from left to right. In each case the maximum load is generated when the high amplitude convolutions enter the narrow sections of tube and the patterns repeats itself with continued pull-through. As the force resisting displacement is generated in part by plastic deformation of the wires there will be a permanent reduction in the magnitude of the load for repeat sections of the curve as shown. FIGS. 3 to 5 illustrate a step-wise change in pull-through load, but this may be made gradual by having a progressive change in amplitude and/or wavelength of the wires. Alternatively the internal cross-sectional size of the outer elements could be arranged to diminish gradually from one end to the other.

It will be appreciated that the arrangements described with reference to FIGS. 1 to 5 offer the facility of controlling the shape of the load/pull-through profile to meet individual requirements. These arrangements are illustrative only and varying profiles may be obtained in a number of different ways. Practical forms of device incorporate large numbers of elements in parallel and an alternative arrangement to give a gradually reducing load would be to arrange for some lengths of high amplitude convolutions to be still within narrow sections of tube after others have pulled through the narrow sections of parallel elements. In a further alternative some of the wires may include regions which are not convoluted and do not contact the outer member. These regions of the wires would not contribute to the pull-through force and by gradually increasing the number of sections of this kind in parallel at successive regions along the length of an article, the pull-through load may be reduced.

In a similar fashion an increase in pull-through load may be brought about by utilising straight sections in some wires during the initial stages of displacement, the straight sections being connected to convoluted sections such that when the latter come into effect all the wires contribute to the resistance to pull-through, thereby requiring a higher pull-through load at that region. In a further arrangement a relatively sudden drop in pull-through load may be brought about by including a link or links in parallel with elements containing convoluted members, the link or links being designed to break at a predetermined load value.

FIG. 6 shows a shock-absorbing or damper member the central portion of which is formed from a number of tubes 15 bonded together, of which two only are shown in the diagram. A central flange 16 attached to the body formed from the tubes serves as a first point of attachment to the cable and the second point of attachment can be either of shackles 17a or 17b. A convoluted wire 18 passes completely through each of the tubes 15 and the wires are anchored at their opposite ends to the shackles. If a load greater than the design load is applied, the wires will be pulled through the central body member until the load applied falls below the critical value. The wires can have varying amplitudes as illustrated in FIG. 1 so that the load to cause pull-through of the wires can be made to vary with increasing extension of the device. In the example shown in FIG. 6 an outer convering formed from a corrugated rubber tube 19 is shown. After a period of use the central portion will be displaced to a position nearer to one end of the device. The device may then be reversed and re-used and overloads applied to the reversed device will tend to move the body portion into its initial central position and the towards the other end of the device.

A further possible arrangement is shown in FIG. 7. In this case only four tubes 25 and wires 28 are shown for convenience. Two attachment points in the form of shackles 27a, 27b, one at each end of the assembly, are provided. Between the central assembly of tubes and each shackle is a metal block 30, half the wires being attached at one end to one block and the other half being attached at the other end to the other block. The ends of the wires not attached to the respective blocks pass freely through holes drilled in these blocks and are connected to the adjacent shackle. When a tensile load is applied across the shackles of sufficient magnitude to cause the wires to be pulled through the tubes, the shackles pull outwards and the blocks 30 move inwards towards the central block of tubes. The device also includes an outer casing formed from telescopically sliding members 29. This could be replaced by a corrugated rubber tube similar to that shown in FIG. 6 or by some other form of collapsible protective cover.

It will be appreciated that in the part of the system shown in FIG. 6 or FIG. 7 where the wires are contained inside the tubes, a force resisting displacement will be generated at the points of contact of the wires with the tubes. This part of the system operates as a variable shear strength interface in a manner similar to that described in the aforesaid French Pat. No. 7,032,188. Thus as the tensile stress in the convoluted wires increases, the wires tend to straighten out and the peaks of the convolutions tend to move away from the inner walls of the tubes. The frictional force resisting longitudinal displacement of the wires within the tubes therefore diminishes as the tensile stress in the wires increases. It can therefore be arranged that the force resisting the displacement generated by this mechanism cannot exceed some upper limiting value which corresponds to the tensile load in the convoluted wires at which the frictional force exerted by the peaks of the convolutions against the walls of the tubes tends to zero. The frictional force resisting longitudinal displacement of the wires at that point then becomes zero so that relative axial movement between the wires and tubes takes place.

If the amplitudes of the waveform of the convolutions are greater than the bores of the tubes, an additional force resisting displacement will be generated by deformation of the wires at the points where they enter the tubes. An advantage of the embodiments shown in FIGS. 6 and 7 lies in the fact that the exposed lengths of the wires are flexible in nature and the devices may therefore be rolled up or collapsed into compact dimensions for storage or transport purposes.

Stress limiting links of the kind illustrated in FIGS. 6 and 7 may be used, for example, in conjunction with a cable such as a steel wire rope. When the tensile load carried by the cable reaches some upper limiting value, less than the breaking load of the cable, the stress limiting link will start to extend until the stress falls below the design limit. The arrangement therefore provides a safety feature to prevent tensile failure of a cable under transient overload conditions. Sudden failure of a cable under tension releases the stored elastic energy and can cause the failed cable to whip about with serious consequences. This can be avoided if a diminishing load prior to complete failure of the stress limiting link is built into the system as discussed above to enable the stored elastic energy in a cable to approach zero before failure occurs.

Stress limiting links constructed according to the invention may also be used in situations where a number of anchoring cables are being used to support a structure. If any of the cables are a little shorter or a little longer than the designed length they will carry a proportionately increased or decreased load compared with the designed figure. Stress limiting links of the kind described above can be used to provide a self-adjusting feature by which the loads carried by the various cables can be prevented from exceeding the design load.

Various modifications may be made without departing from the invention. For example while reference has been made primarily to convoluted wires disposed within tubes, the invention is also applicable to articles having corrugated inner members held between outer members of flat or tubular form. Where such an inner member is held between flat plates the spacing between the plates may be altered to vary the pull-through force and a similar variation may be effected by varying the width of the corrugated members. Where a corrugated inner member of this kind is used the load must be applied transversely to and not parallel to the corrugations.

In the case of wires acting in tubes the wires may be crimped in one plane only or could be helically wound; in the latter case the wires would be in line contact rather than point contact with the inner walls of the tubes. Helically wound wires may also be used as the inner members between outer members consisting of spaced plates.

Stress limiting links according to the invention may be incorporated in many articles apart from those described. One example is a seat belt mounting, one group of members being attached to the belt and the other to an attachment point on the vehicle. Road side crash barriers could also incorporate such links at intervals or could be mounted on series of shock-absorbing supports constructed in accordance with the invention. Other panel structures liable to impact could be mounted iin a similar fashion.

We claim:

1. A stress limiting device comprising a plurality of parallel elements each including an outer member and an inner member, the inner member being of convoluted form and compressed by the outer member in a direction transverse to its length so that the peaks of the convolutions are in frictional contact with the associated outer member, the arrangement being such that as the inner member tends to straighten out the frictional contact between the peaks and the outer member is reduced, means for transmitting a force to the inner members in a direction which tends to straighten them, and means for transmitting an oppositely directed force to the outer members, transmission of such forces above a critical stress level causing the whole of each inner member to move bodily with respect to its associated outer member in the direction of the force applied to the inner member.

2. A stress limiting device according to claim 1 wherein the force-transmitting means comprise attachment means provided on one of the members of each element such that when the other member is held against movement a load may be applied through said attachment means to move the one member relative to the other.

3. A stress limiting device according to claim 2 wherein attachment means are provided on both the members of each element to enable movement of the inner members and outer members in opposite directions.

4. A stress limiting device according to claim 1 wherein the operative length of one member of each element is greater than that of the other member.

5. A stress limiting device according to claim 4 wherein the inner member of each element projects beyond the outer member at both ends thereof.

6. A stress limiting device according to claim 1 wherein the outer member of each element is a tube and the inner member a wire.

7. A stress limiting device according to claim 1 wherein the inner member of each element is of corrugated form with its corrugations arranged transversely to the direction of the applied stress.

8. A stress limiting device according to claim 1 wherein means is provided to vary the pull-through load required to effect relative movement of said inner and outer members at different relative positions thereof.

9. A stress limiting device according to claim 8 wherein said means comprises a change in the geometrical form of the inner member of at least some of said elements at at least one region along its length.

10. A stress limiting device according to claim 9 wherein the amplitude of the convolutions of said inner member are varied at at least one location along its length.

11. A stress limiting device according to claim 9 wherein the frequency of the convolutions of said inner member is varied at at least one location along its length.

12. A stress limiting device according to claim 8 wherein said means comprises a change in the cross-sectional area of the outer member of at least one of said elements at at least one location along its length.

13. A stress limiting device according to claim 8 wherein said means comprises a change in the cross-sectional shape of the outer member of at least one of said elements at at least one location along its length.

14. A stress limiting device according to claim 8 wherein said means to vary the pull-through load is arranged to produce a step-wise change in such load at at least one location along the length of the device.

15. A stress limiting device according to claim 8 wherein said means to vary the pull-through load is arranged to produce a progressive change in such load at at least one location along the length of the device.

16. A stress limiting device according to claim 1 wherein the outer members of all said elements are consolidated to form a unitary body member.

17. A stress limiting device according to claim 16 in the form of a shock-absorber in which first attachment means is secured to said body member and the inner members pass completely through apertures in the body member and project therefrom at both ends, there being anchoring means spaced from the opposite ends of said body member and to which the free ends of said inner members are connected, and second and third attachment means associated with the respective anchoring means whereby the body member and said inner members may be drawn in opposite directions by a load applied between said first attachment means and one of said other attachment means.

18. A stress limiting device according to claim 17 wherein said body member is formed from a plurality of tubes bonded together.

19. A stress limiting device according to claim 16 including a protective outer covering of telescopic construction.

20. A stress limiting device according to claim 16 in the form of a shock absorber wherein said inner members pass completely through apertures in the body member and project therefrom at both ends, there being attachment means spaced from the opposite ends of said body member and anchoring members located between the attachment means and the respective ends of the body member, a proportion of said inner members having one end thereof connected to one of said attachment means and the other end to the other of said anchoring members, and the remainder of said inner members having one end connected to the other of said attachment means and the other end connected to the remaining anchoring member, those inner members not connected to the respective anchoring members passing freely through apertures formed therein.

21. A stress limiting device according to claim 20 including a protective outer covering of telescopic construction.

22. A stress limiting device comprising an element having an outer member and an inner member, the inner member being of convoluted form and compressed by the outer member in a direction transverse to its length so that the peaks of the convolutions are in frictional contact with the outer member, the arrangement being such that as the inner member tends to straighten out the frictional contact between the peaks and the outer member is reduced, means for transmitting a force to the inner member in a direction which tends to straighten it, and means for transmitting an oppositely directed force to the outer member, transmission of such forces above a critical stress level causing the whole of the inner member to move bodily with respect to the outer member in the direction of the force applied to the inner member.

23. A stress limiting device according to claim 22 incorporated as a link in a load-carrying rope or cable.

24. A stress limiting device according to claim 23 arranged to have a diminishing pull-out load as elongation of the device increases.

25. A stress limiting device according to claim 22 supporting a panel member to define an impact absorbing structure.

26. A stress limiting device according to claim 22 incorporated in a seat belt.

27. A stress limiting device comprising an element having first and second members arranged in frictional contact with each other, one of said members being of convoluted form and compressed by the other member in a direction transverse to its length so that as it tends to straighten out the frictional contact between the two members is reduced, means for transmitting force to said one member in a direction which tends to straighten it, and means for transmitting an oppositely directed force to said other member, transmission of such forces above a critical stress level causing the whole of said one member to move bodily with respect to said other member in the direction of the force applied to said one member.

28. A stress limiting device according to claim 27 wherein the convolutions of said one member have peaks which are maintained in frictional contact with said other member.

29. A stress limiting device according to claim 27 wherein said members are located one within the other.

* * * * *